[19] United States Patent
Matteson et al.

[11] 4,194,818
[45] Mar. 25, 1980

[54] ELECTRONIC FLASH UNIT FOR FILL-FLASH PHOTOGRAPHY

[75] Inventors: Lawrence J. Matteson; David J. Shonts, both of Rochester, N.Y.

[73] Assignee: Eastman Kodak Company, Rochester, N.Y.

[21] Appl. No.: 953,398

[22] Filed: Oct. 23, 1978

[51] Int. Cl.² .............................................. G03B 15/05
[52] U.S. Cl. ...................................... 354/33; 354/34; 354/141; 354/145
[58] Field of Search .................. 354/33, 34, 137, 138, 354/140, 141, 145, 60 F; 315/151, 241 P

[56] References Cited
U.S. PATENT DOCUMENTS

| 3,568,582 | 3/1971 | Uchida | 354/34 |
| 3,878,433 | 4/1975 | Sato | 315/241 P |
| 4,074,288 | 2/1978 | Johnson | 354/33 |

Primary Examiner—George H. Miller, Jr.
Assistant Examiner—William B. Perkey
Attorney, Agent, or Firm—D. P. Monteith

[57] ABSTRACT

A quenchable electronic flash for use with a camera having an M-contact flash synchronization device, includes a flashtube for producing light, a light-responsive integrating circuit for producing a flash terminating signal when the quantity of light measured by the integrating circuit reaches a predetermined level representative of a desired film exposure, and a quench circuit responsive to the flash terminating signal for terminating the production of further light by the flashtube. A time control circuit, responsive to actuation of the flash synchronization device, energizes the integrating circuit substantially with initial opening movement of a shutter of the camera. As a result, the integrating circuit is prevented from responding to any light prior to initiation of an exposure interval and responds to a quantity of light that corresponds substantially to the light, e.g. ambient as well as flash, impinging on film in the camera during an exposure.

4 Claims, 3 Drawing Figures

ELECTRONIC FLASH UNIT FOR FILL-FLASH PHOTOGRAPHY

BACKGROUND OF THE INVENTION

1. Field of the Invention

This invention relates generally to electronic flash apparatus, and more particularly to an improved electronic flash unit in which light produced by the flash unit is regulated in accordance with the total quantity of scene light impinging on a photographic film in a camera.

2. Description Relative to the Prior Art

When an electronic flash unit is used in flash photography, an associated camera normally employs a flash synchronizing device which is operated in what is commonly known as "X-contact" synchronization for firing the flash unit. "X-contact" synchronization refers to firing the flash unit at a point in time which ensures that maximum brilliance of the flash is reached when a camera shutter is fully open. The maximum duration of a flash of light produced by an electronic flash unit is normally no longer than about 1 millisecond (ms), and the interval required for a camera shutter to fully open after actuation, that is, the shutter lead time, can be on the order of 4 or 5 ms. Therefore, the "X" synchronization of an electronic flash unit with a shutter must allow for the shutter lead time. Typically, X-contacts are closed to fire an electronic flash unit only after the shutter has fully opened.

A camera having a flash synchronizing device for firing a flashbulb employs what is commonly known as "M-contact" synchronization. Flashbulb light normally has a duration of approximately 40 ms, the peak light intensity being reached in approximately 10 ms followed by a gradual decay. So that the maximum brilliance of the light from a flashbulb occurs when the camera shutter is fully open, M-synchronization closes M-contacts to energize a flash firing circuit before the shutter is fully open, and often the M-contacts are closed before the shutter even starts to open.

A camera having M-contact synchronization can be adapted to fire an electronic flash unit so that the flash occurs when the shutter is open. Such a flash unit or the camera employs time-delay means associated with the M-contacts for providing a flash triggering signal a predetermined time period after a flashbulb would be fired. The delay provided by the time-delay means is related to the interval between when the M-contacts close and the shutter opens fully so that the electronic flash unit can be fired when the shutter is fully open. U.S. Pat. Nos. 3,521,540, 3,559,548 and 3,969,737 disclose electronic flash units which may be operated with cameras adapted to fire flashbulbs through M-contacts.

It is known for electronic flash units to employ light-integrating circuits for controlling the amount of flash light in accordance with reflected scene light. Such flash units are known as quench type or quenchable electronic flash units. A quenchable electronic flash unit would include an energizable quench circuit that is coupled to the light-integrating circuit and that is also associated with a flashtube and a flash-firing capacitor. When the light-integrating circuit senses a predetermined amount of reflected scene light, representing a desired exposure, the quench circuit is energized. When this happens, further transfer of energy from the flash-firing capacitor to the flashtube is terminated, thereby quenching the flashtube.

A quenchable electronic flash unit normally includes apparatus for preventing the light-integrating circuit from responding to any light prior to the actual firing of the flashtube. Such apparatus is considered to be highly desirable because, if the light-integrating circuit were to respond to light other than that light produced by the flash unit itself, the light-integrating circuit would prematurely energize the quench circuit causing early flashtube quenching or, in some situations, causing the flashtube not to fire at all.

A variety of patents disclose quenchable electronic flash units having means for preventing the light-integrating circuit from responding to light prior to the production of light by the flash unit. For example, U.S. Pat. No. Re 26,999 discloses a quenchable electronic flash unit in which a light-integrating circuit is energized only after the flashtube has emitted a pulse of light.

U.S. Pat. No. 3,519,879 includes a light-integrating circuit for a quenchable electronic flash unit wherein the triggering of the flash unit is the sole condition which energizes the light-integrating circuit. To accomplish this, a normally conducting transistor de-energizes the light integrating circuit. This transistor is turned OFF, to energize the integrating circuit, only upon the occurrence of a voltage change, in a flashtube trigger circuit, representative of the triggering of the flashtube.

U.S. Pat. No. 3,727,100 discloses a quenchable electronic flash in which a delay circuit is provided for causing the integrating circuit to be ready to receive reflected scene light about 10 microseconds prior to the production of light by the flashtube. This is done to insure that a photoconductive element of the integrating circuit is in a stable electric condition at the instant the flashtube emits light, thus permitting the photoconductor to more rapidly respond to reflected flashtube light.

Accordingly, these prior art quenchable electronic flash units commence to measure light reflected from an object being photographed only from the instant of the production of the flash light or a very brief interval prior to such production. When such electronic flash units are used with cameras employing X-contact synchronization or are used with cameras employing M-contact synchronization with time delay means associated with the M-contacts, the flash unit light-integrating circuit does not respond to light until after the camera shutter opens.

Frequently, however, it is desirable to provide flash illumination when there exists significant ambient illumination, such as operation of a photographic camera in what is commonly called a "fill-flash" mode. These prior art flash units have a disadvantage in fill-flash because the flash integrating circuit does not take into account the light "seen" by photographic film in the camera during the interval the camera shutter is opened prior to the production of flash light. The initial exposure, which occurs during this interval, can be a substantial portion of the total exposure. Unless this initial exposure is effectively accounted for by the light-integrating circuitry in the flash unit, an appreciable overexposure error results in fill-flash, because the flashtube is not quenched soon enough. The error can be particularly troublesome for a photographic process that has a narrow "exposure latitude" such as used in self-processing cameras.

SUMMARY OF THE INVENTION

According to the present invention, the problem identified hereinabove has been solved in a quenchable electronic flash unit comprising a light-responsive integrating circuit having (1) a de-energized state in which the integrating circuit is non-responsive to light, and (2) an energized state in which the integrating circuit is responsive to light. The flash unit includes an electronic switch associated with the integrating circuit and having (1) a non-conductive state in which the integrating circuit is maintained in its de-energized state, and (2) a conductive state in which it applies an electrical potential to the integrating circuit for switching the latter to its energized state. A first circuit timing means, responsive to actuation of a flash synchronizing device in a camera, switches the electronic switch from its non-conductive to its conductive state substantially with opening movement of a shutter in the camera, thereby causing the integrating circuit to commence to sense light substantially with impingement of scene light on film in the camera. The flash unit further includes second circuit timing means having circuit delay means associated with the first circuit timing means for causing a flash trigger circuit to trigger a flashtube ON after the shutter is fully opened. The flash unit also includes a quench circuit, responsive to the integrating circuit sensing a predetermined amount of light representing a desired exposure, for terminating further discharge of the flashtube. With this improved electronic flash unit the integrating circuit is prevented from responding to any light prior to initiation of an exposure interval and thus prevents premature quenching of the flashtube. The integrating circuit therefore responds to a total quantity of light, i.e., flash plus ambient light, that more closely corresponds to the total quantity of light impinging on film in the camera.

The invention, and its advantages, will become more apparent in the detailed description of a preferred embodiment presented below.

DESCRIPTION OF THE DRAWINGS

The invention will be described with reference to the accompanying drawings, wherein.

DESCRIPTION OF A PREFERRED EMBODIMENT

Because photographic cameras and electronic flash units are well known, the present description will be directed in particular to elements forming part of, or cooperating directly with, apparatus in accordance with the present invention. It is to be understood that camera elements and electronic flash unit elements not specifically shown or described may take various forms well known to those having skill in the photographic art.

Figure 1:
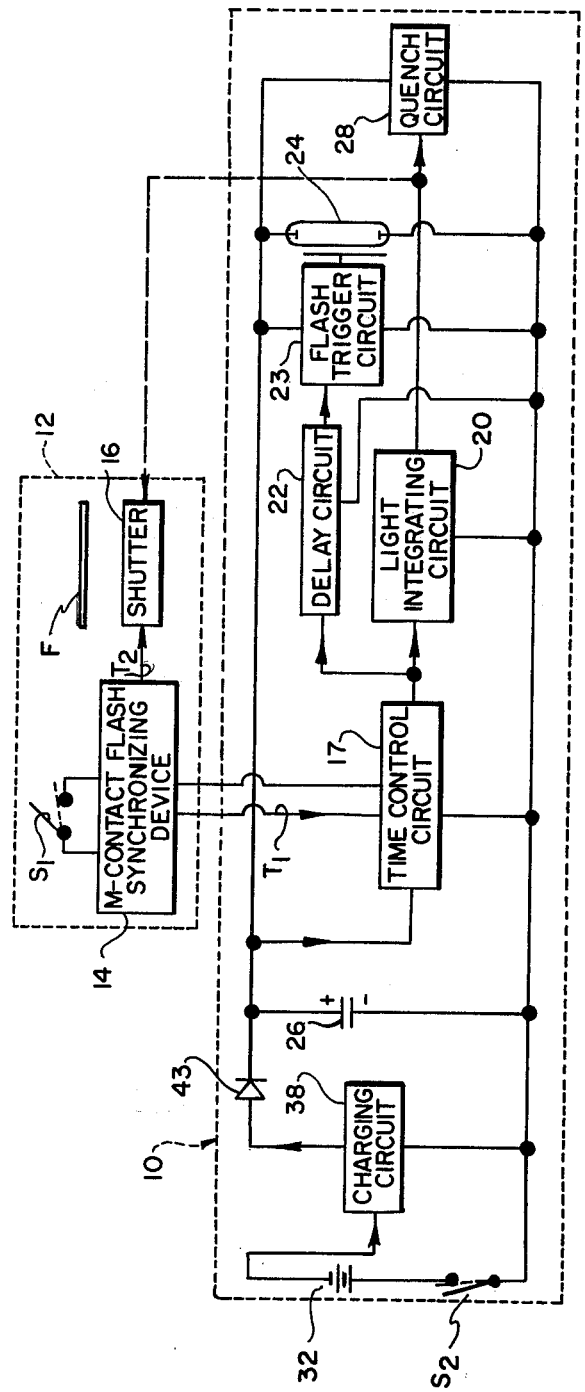
FIG. 1 includes a signal flow chart for a control circuit for an electronic flash unit according to the present invention.
Figure 3:
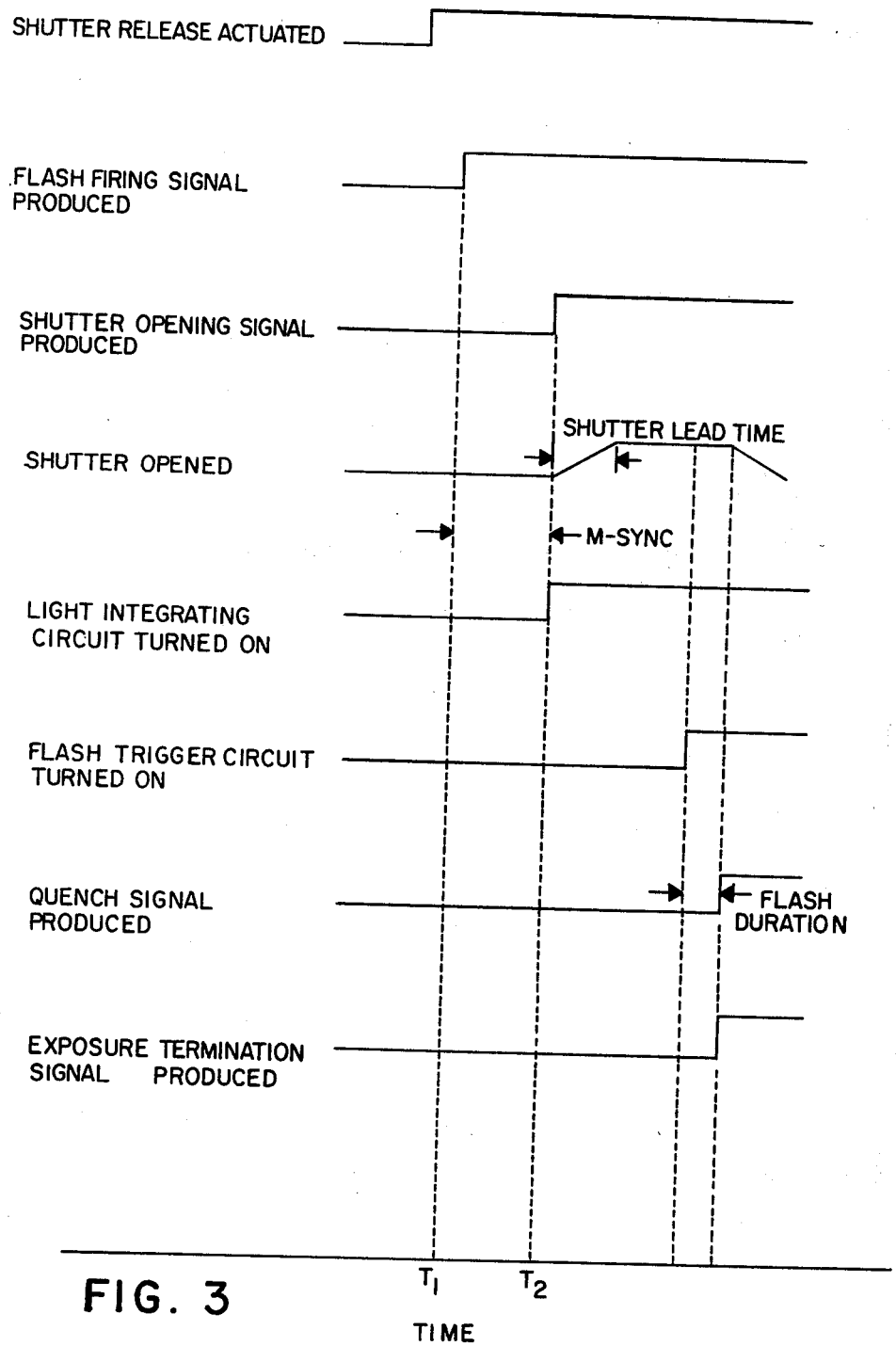
FIG. 3 is a timing diagram showing the operation of the electronic flash unit in conjunction with an associated camera.

FIG. 1 shows a signal flow diagram for a control circuit for a quenchable electronic flash unit 10, according to the invention. As can be seen in the signal flow diagram and with reference to a timing diagram of FIG. 3, a camera 12 includes an M-contact flash synchronizing device 14 for providing a flash firing signal at a time $T_1$ to the electronic flash unit, which is attached to the camera by means well known in the art. The flash synchronizing device 14 also provides a shutter actuating or opening signal at a time $T_2$ to a shutter 16 to initiate exposure of a film F in the camera 12. When the shutter opening signal occurs, the shutter 16 is actuated by means well known in the art to move from a closed, light-blocking position to an open, light-unblocking position. Because the camera 12 is of the type that employs M-contact synchronization, i.e. the flash firing signal is produced simultaneously with or before the shutter 16 even starts to open, the time $T_1$ at which the flash firing signal is produced occurs prior to or simultaneously with the time $T_2$ at which the shutter 16 begins to open. FIG. 3 shows the time $T_1$ occurring prior to the time $T_2$.

Referring back to FIG. 1, flash synchronizing device 14 is actuated to produce the flash firing signal by closing a control switch $S_1$, which can be associated with a shutter release button (not shown) located on the camera body so as to be accessible to a camera operator. The flash firing signal is applied to a time control circuit 17 in the electronic flash unit 10. The time control circuit 17 constitutes means for energizing a normally de-energized light-responsive integrating circuit 20 substantially simultaneously with initial opening movement of the shutter 16. Integrating circuit 20 constitutes means for producing a flash terminating signal when it senses a predetermined amount of light representative of a desired film exposure. Because time $T_1$ occurs prior to the time $T_2$, the time control circuit 17 delays the energizing of the integrating circuit 20 so that light integrating begins substantially with the opening of the shutter 16. As the integrating circuit is energized or turned ON, the time control circuit 17 provides a signal to a time delay circuit 22, which constitutes means for energizing a flash trigger circuit 23 once the shutter 16 is fully opened. Therefore, the delay circuit 22 delays triggering of a flashtube 24 after the integrating circuit is turned ON to allow for the lead time of the shutter 16.

When the flashtube 24 is triggered, a flash firing capacitor 26 discharges stored energy through the flashtube 24 to produce a brief high intensity pulse of light. The output signal of the integrating circuit 20 is applied to the input stage of a quench circuit 28, which constitutes means for terminating or preventing the production of light by the flashtube. The quench circuit 28 would be in the form of a level-sensing switch which becomes conductive when the amplitude of the output signal of the integrating circuit 20 reaches or exceeds a predetermined level representing the total exposure required. When the quench circuit 28 becomes conductive, the energy, discharging from the capacitor 26, is diverted from the flashtube 24 through the quench circuit 28, thereby terminating further light from the flashtube 24. As shown by the broken line in FIG. 1 and the timing diagram of FIG. 3, the output signal from the light-responsive integrating circuit 20 can also serve as a shutter closing or exposure termination signal to close the shutter 16. Also, as can be seen with reference to the signal flow of FIG. 1 and the timing diagram of FIG. 3, the light-responsive integrating circuit 20 of the quenchable electronic flash unit 10 is prevented from responding to any light prior to initiation of a film exposure interval to prevent premature quenching of the flashtube and responds to a total quantity of light that more closely corresponds to the total quantity of light impinging on film in the camera 12.

Figure 2:
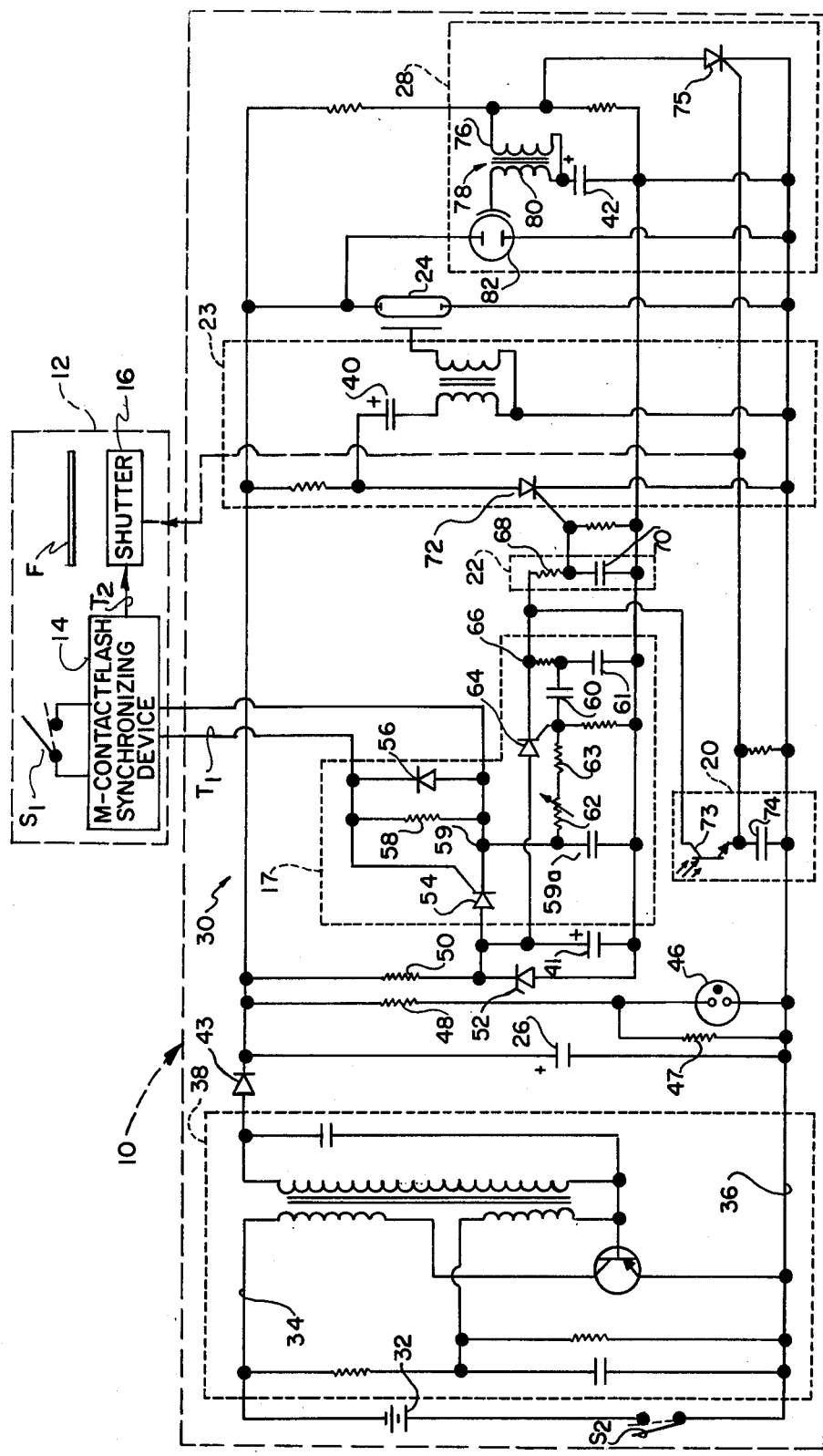
FIG. 2 is a circuit diagram of a control circuit according to the present invention that embodies the signal flow chart in FIG. 1.

A schematic diagram of a control circuit, embodying the signal flow according to the present invention, is shown in FIG. 2. The control circuit, generally designated 30, is powered by a battery 32 which is connected between a power feed line 34 and a return line 36. A normally-open main power switch $S_2$, connected in series with the battery 32, would be closed in response to actuation of the shutter release button to energize the control circuit 30 prior to exposure control. The control circuit includes a conventional voltage converter circuit or charging circuit 38, also shown in FIG. 1, for stepping-up or converting the relatively low voltage of the battery 32 to a level sufficient to adequately charge (1) the flash-firing capacitor 26, (2) a trigger capacitor 40 of the flash trigger circuit 23, (3) a voltage-supply capacitor 41 of the time control circuit 17, and (4) a trigger capacitor 42 of the quench circuit 28. Charging circuits for electronic flash units are well known in the art (see, for example, the aforementioned U.S. Pat. No. 3,969,737) and, therefore, no further description of the elements of the charging circuit 38 is considered necessary.

A diode 43 is connected to the output of the charging circuit 38 so that each of a series of positive pulses produced by the charging circuit causes the diode 43 to conduct so as to charge the capacitors 26, 40, 41 and 42 with a polarity, as shown.

A voltage-sensitive indicator, such as a neon lamp 46 parallel to a resistor 47, is connected in series with a resistor 48, the series combination being connected parallel to the flash-firing capacitor 26. The lamp 46 turns ON, to indicate to a flash operator that the electronic flash unit 10 is ready to be fired, when the firing capacitor 26 is charged to a level that is adequate to fire the flashtube 24. This level is normally about 250 to 300 volts.

A resistor 50 and a series-connected zener diode 52 are also connected parallel to the firing capacitor 26, the diode 52 being parallel to the aforementioned voltage supply capacitor 41. The zener diode provides a supply of constant voltage to the capacitor 41 for energizing the time control circuit 17.

The control circuit 30 of the electronic flash unit 10 functions in association with a camera 12 of the type having M-contact synchronization in the following manner. The time control circuit 17 is energized when the gate electrode of an SCR 54 receives the aforementioned flash firing signal at time $T_1$ from the M-contact flash synchronizing device 14. A diode 56, which is connected between the gate electrode and cathode of the SCR 54, serves to limit the magnitude of any negative transients in the flash firing signal to protect against permaturely turning OFF the SCR 54. A resistor 58, which is connected parallel to the diode 56, limits positive transients in the flash firing signal to protect against excessively forwardly biasing the gate electrode of the SCR. When the SCR 54 is turned ON, a voltage is supplied immediately by the voltage supply capacitor 41 to the junction 59. The voltage at the junction 59 causes a capacitor 59a to commence to charge, and a capacitor 60 and a capacitor 61 to commence to charge through a variable resistor 62 and a resistor 63. The resistance of the resistor 62 is variable to control the rate at which the capacitors 60 and 61 charge. This charging rate is determined by the time interval between $T_1$ and $T_2$, i.e. the time interval between when the flash firing signal is produced and when the aforementioned shutter opening signal is produced or, in other words, when the shutter 16 commences to open. When the capacitor 60 and the capacitor 61 are charged to a predetermined level representing the time at which the shutter opening signal is produced, an SCR 64 is turned ON causing a voltage proportional to the voltage on the capacitor 41 to appear instantaneously at a junction 66. The voltage at the junction 66 serves as a bias voltage to energize the normally de-energized light-responsive integrating circuit 20. It will be clear from the foregoing discussion immediately above and from the discussion in connection with the signal flow of the diagram of FIG. 1 that the time control circuit 17, by means of the two resistors 62 and 63 and the two capacitors 60 and 61, serves to turn the light-integrating circuit 20 ON at the same time that the M-contact flash synchronizing device 14 initiates opening of the shutter 16 by means of the shutter opening signal. Accordingly, the integrating circuit 20 can respond to light as the shutter 16 opens to expose film F in the camera.

So that the flashtube 24 may be fired when the shutter 16 is fully open, the time delay circuit 22, which consists of a resistor 68 connected in series to a capacitor 70, delivers a control voltage to the gate electrode of an SCR 72 of the trigger circuit 23 when the capacitor 70 is charged to a given level representing the interval of time required for the shutter 16 to open fully once the shutter is commanded to open by means of the shutter opening signal, i.e., the shutter lead time. When the SCR 72 is turned ON, the trigger circuit 23 is energized to trigger the flashtube 24.

During the time the shutter 16 is opening but prior to the triggering of the flashtube 24, the light-responsive integrating circuit 20 is integrating the light impinging on a phototransistor 73 and produces a signal of a predetermined magnitude across an integrating capacitor 74 when the total light sensed by the phototransistor 73 represents a desired film exposure. This signal turns ON an SCR 75 of the quench circuit 28. When this happens, the aforementioned trigger capacitor 42 discharges through a primary coil 76 of a quench transformer 78 and the SCR 75. Under transformer action, a voltage is induced in the secondary coil 80 of the transformer 78 to fire a low impedance quench tube 82 to thereby quench or terminate further light from the flashtube 24.

In an exposure mode intended to be fill-flash, when ambient light is sufficiently high it is possible that the flashtube 24, although triggered, may not fire. This results when the ambient light, including any light produced by other photographic flash devices, causes the integrating circuit 20 to produce its output signal to energize the quench circuit 28 prior to the delay circuit 22 energizing the trigger circuit 23. If this were the case, the quench circuit 28 would be turned ON thereby preventing the firing of the flashtube 24 when the delay circuit 22 subsequently energizes the flash trigger circuit 23.

However, it may be preferred to have a flash exposure in bright ambient light conditions, so that the flash softens dark shadows. In bright ambient light, if the flash were not fired shortly after the shutter opens, it would be necessary to delay the energizing of the light integrating circuit, after the shutter opens, until a short time before the flash is intended to be fired. By delaying the energizing of the integrating circuit in this manner, the flash can be fired in bright light, to produce a fill-flash exposure. Of course, in this situation, the light integrated by the integrating circuit does not correspond closely to the total amount of light impinging on the film, as is the case when the integrating circuit is energized at the time the shutter begins to open.

The invention has been described in detail with reference to the figures in the drawings. However, it will be appreciated that variations and modifications are possible which are within the spirit and scope of the invention. For example, the two resistors 62 and 63 and the capacitor 60 would not be needed if the shutter opening signal were produced at the same time as the flash firing signal, i.e., $T_1$ and $T_2$ coincided.

What is claimed is:

1. In electronic flash apparatus for use with a camera, the camera including (1) a movable shutter having a lead time defined by the interval required for the shutter to move from (i) a light-blocking position, to (ii) a fully-opened light-unblocking position, and (2) synchronizing means actuatable for producing artificial illumination in synchronization with actuation of the shutter, said electronic flash apparatus having (1) a flashtube for producing light to illuminate a scene, and (2) means operable, upon energization thereof, for triggering said flashtube to produce such light, the improvement comprising:
   (a) integrating means having (1) a first condition in which it is non-responsive to light, and (2) a second condition in which it is responsive to light, said integrating means being exposable to light to produce a terminating signal when said integrating means responds to a predetermined amount of light representative of a desired exposure;
   (b) control means, coupled to said integrating means, including bistable means having (1) a first state for maintaining said integrating means in its first condition, and (2) a second state for applying a fixed voltage to said integrating means for switching said integrating means into its second condition, said control means further including timing means, responsive to the actuation of the synchronizing means, for causing said bistable means to assume its second state for switching said integrating means from its first condition into its second condition substantially concurrently with movement of the shutter from its light-blocking position toward its fully-opened light-unblocking position, thereby causing said integrating means to commence to sense light substantially concurrently with impingement of scene light on film in the camera;
   (c) time delay means, coupled to said bistable means and to said triggering means, for energizing said triggering means following the switching of said integrating means into its second condition, said time delay means providing a time delay which commences when said bistable means assumes its second state and which is at least as great as the lead time of the shutter such that said triggering means becomes energized only when the shutter is in its fully-opened light-unblocking position; and
   (d) means, coupled to said integrating means, responsive to said terminating signal for preventing further discharge of said flashtube, whereby the light transmitted by said electronic flash apparatus is controlled in accordance with the total amount of light impinging on film in the camera.

2. In an electronic flash apparatus for use with a camera, the camera including (1) a movable shutter having a lead time defined by the interval required for the shutter to move from (i) a light-blocking position, to (ii) a fully-opened light-unblocking position, and (2) synchronizing means actuatable for synchronizing flash energization with movement of the shutter from its light-blocking position into its fully-opened light-unblocking position to effect a film exposure, said electronic flash apparatus having (1) a flashtube for producing light to illuminate a scene, and (2) means operable, upon energization thereof, for triggering said flashtube to produce such light, the improvement comprising:
   (a) integrating means having (1) a first condition in which it is non-responsive to light, and (2) a second condition in which it is responsive to light, said integrating means being exposable to light to produce a terminating signal when said integrating means responds to a predetermined amount of light representative of a desired exposure;
   (b) bistable switching means, coupled to said integrating means, having (1) a first state for maintaining said integrating means in its first condition, and (2) a second state for applying a time invariant electrical potential to said integrating means to switch the latter into its second condition;
   (c) first timing means, responsive to actuation of the synchronizing means, for switching said bistable switching means from its first state into its second state to cause said integrating means to assume its second condition substantially concurrently with movement of the shutter from its light-blocking position toward its fully-opened light-unblocking position, thereby causing said integrating means to commence to sense light substantially concurrently with impingement of scene light on film in the camera;
   (d) second timing means, coupled to said bistable switching means and said triggering means, and having a time delay for energizing said triggering means following the switching of said integrating means into its second condition, the time delay commencing when said bistable switching means assumes its second state and being at least as great as the lead time of the shutter such that said triggering means can become energized only when the shutter is in its fully-opened light-unblocking position; and
   (e) means, coupled to said integrating means, responsive to said terminating signal for terminating further discharge of said flashtube, whereby the light transmitted by said electronic flash apparatus is controlled in accordance with the total amount of light impinging on film in the camera.

3. In electronic flash apparatus for use with a camera, the camera including (1) a movable shutter having a lead time defined by the interval required for the shutter to move from (i) a light-blocking position, to (ii) a fully-opened light-unblocking position, and (2) a flash synchronizing device actuatable for producing artificial illumination in synchronism with movement of the shutter from its light-blocking position into its fully-opened light-unblocking position, said electronic flash apparatus having (1) a flashtube for producing light to illuminate a scene, and (2) means operable, upon energization thereof, for triggering said flashtube to produce such light, the improvement comprising:
   (a) light-responsive integrating circuit means having (1) a de-energized state in which it is non-responsive to light, and (2) an energized state in which it is responsive to light, said light-responsive integrating circuit means being exposable to light to produce a terminating signal when said integrating circuit means responds to a predetermined amount of light representative of a desired exposure;
(b) electronic bistable switching means coupled to said light-responsive integrating circuit means and having (1) a non-conductive state for maintaining said light-responsive integrating circuit means in its de-energized state, and (2) a conductive state for applying a predetermined electrical potential to said light-responsive integrating circuit means to switch the latter into its energized state;
(c) first electronic timing means, responsive to actuation of the flash synchronizing device, for switching said electronic bistable switching means from its non-conductive state into its conductive state to cause said integrating circuit means to assume its energized state substantially concurrently with commencement of movement of the shutter from its light-blocking position toward its fully-opened light-unblocking position, thereby causing said light-responsive integrating circuit means to commence to sense light substantially concurrently with impingement of scene light on film in the camera;
(d) second electronic timing means, coupled to said triggering means and said bistable switching means, and having a time delay which commences when said bistable switching means assumes its conductive state and which is at least as great as the lead time of the shutter for energizing said triggering means only if said integrating circuit means senses an amount of light during the shutter lead time that is less than said predetermined amount of light representing a desired exposure; and
(e) means, coupled to said integrating circuit means, responsive to said terminating signal for terminating the production of further light by said flashtube, whereby the light transmitted by said electronic flash apparatus is controlled in accordance with the total amount of light impinging on film in the camera.

4. In electronic flash apparatus for use with a camera, the camera including (1) a movable shutter having a lead time defined by the interval required for the shutter to move from (i) a light-blocking position, to (ii) a fully-opened light-unblocking position, and (2) a flash synchronizing device actuatable for producing artificial illumination in synchronism with movement of the shutter from its light-blocking position toward its fully-opened light-unblocking position, said electronic flash apparatus having (1) a flashtube energizable for producing a given quantity of light to illuminate a scene, (2) means operable, upon energization thereof, for triggering said flashtube to produce said given quantity of light, and (3) a quench circuit coupled to said flashtube for terminating the light before such given quantity is produced, the improvement comprising:
(a) light-responsive integrating circuit means having (1) a de-energized state in which it is non-responsive to light, and (2) an energized state in which it is responsive to light, said light-responsive integrating circuit means being exposable to light to produce a terminating signal when said integrating circuit means responds to a predetermined amount of light representative of a desired exposure;
(b) electronic bistable switching means, coupled to said light-responsive integrating circuit means, and having (1) a non-conductive state for maintaining said light-responsive integrating circuit means in its de-energized state, and (2) a conductive state for applying a time invariant electrical potential to said light-responsive integrating circuit means to switch the latter into its energized state;
(c) first electronic timing means, responsive to actuation of the flash synchronizing device, for switching said electronic bistable switching means from its non-conductive state into its conductive state to cause said integrating circuit means to commence to respond to light substantially concurrently with commencement of movement of the shutter from its light-blocking position toward its fully-opened light-unblocking position, thereby causing said light-responsive integrating circuit means to commence to sense light substantially concurrently with impingement of scene light on film in the camera; and
(d) second electronic timing means, coupled to said triggering means and to said bistable switching means, and having a time delay which is at least as great as the lead time of the shutter and which commences when said bistable switching means assumes its conductive state, said second electronic timing means being effective to energize said triggering means to produce light by said flashtube in the event said integrating circuit means senses an amount of light during the shutter lead time that is less than said predetermined amount of light representing a desired exposure;
(e) said quench circuit being coupled to said light-responsive integrating circuit means and being effective to prevent said flashtube from producing light in the event said integrating circuit means produces said terminating signal prior to the time the shutter moves into its fully-opened light-unblocking position, whereby the light transmitted by said electronic flash apparatus is controlled in accordance with the total amount of light impinging on film in the camera.

* * * * *